(12) United States Patent
Brewer et al.

(10) Patent No.: US 11,511,744 B2
(45) Date of Patent: Nov. 29, 2022

(54) SYSTEM AND METHOD FOR AUTOMATED OFF-ROAD SPEED CONTROL FOR A VEHICLE

(71) Applicant: Ford Global Technologies, LLC, Dearborn, MI (US)

(72) Inventors: Michael Edward Brewer, Dexter, MI (US); Brandon Cameron, Canton, MI (US); Brian Grewe, Northville, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 354 days.

(21) Appl. No.: 17/000,971

(22) Filed: Aug. 24, 2020

(65) Prior Publication Data

US 2022/0055621 A1 Feb. 24, 2022

(51) Int. Cl.
*B60W 30/10* (2006.01)
*B60W 10/18* (2012.01)
*B60W 10/04* (2006.01)
*B60W 30/14* (2006.01)
*B60W 40/105* (2012.01)

(52) U.S. Cl.
CPC .......... *B60W 30/146* (2013.01); *B60W 10/04* (2013.01); *B60W 10/18* (2013.01); *B60W 40/105* (2013.01); *B60W 2710/0666* (2013.01)

(58) Field of Classification Search
CPC ....... B60K 31/00; B60W 10/04; B60W 10/18; B60W 30/146; B60W 40/105; B60W 2510/0657; B60W 2540/10; B60W 2540/12; B60W 2552/10; B60W 2710/0666

USPC .............. 701/70, 78, 84, 87, 88, 90, 93, 110
See application file for complete search history.

(56) References Cited

U.S. PATENT DOCUMENTS

| | | | |
|---|---|---|---|
| 6,530,862 B2 * | 3/2003 | Kolmanovsky | F02D 13/04 477/118 |
| 7,229,139 B2 | 6/2007 | Lu et al. | |
| 9,701,292 B2 | 7/2017 | Fairgrieve et al. | |
| 9,701,309 B2 | 7/2017 | Fairgrieve et al. | |
| 2002/0019295 A1 * | 2/2002 | Kobayashi | F16H 63/46 477/174 |
| 2008/0154472 A1 * | 6/2008 | Okuda | B60W 30/18118 180/170 |

(Continued)

FOREIGN PATENT DOCUMENTS

| CN | 107207011 A | * | 9/2017 | .............. B60K 28/16 |
| CN | 111942358 A | * | 11/2020 | ................ B60K 6/52 |

(Continued)

*Primary Examiner* — B M M Hannan
(74) *Attorney, Agent, or Firm* — Burr & Forman LLP; Greg Brown

(57) ABSTRACT

A method of providing automated control of vehicle speed in a driver assist mode may include receiving an operator selection of the driver assist mode and a target speed, monitoring vehicle speed, and generating a propulsive torque request and a braking torque request based on a difference between the target speed and the vehicle speed. The method may further include, responsive to vehicle speed being in a selected range from zero to about three miles per hour, initiating a low speed correction to automatically provide a variable modification to the propulsive torque request or the braking torque request.

20 Claims, 9 Drawing Sheets

(56) References Cited

U.S. PATENT DOCUMENTS

| | | | |
|---|---|---|---|
| 2014/0277987 A1* | 9/2014 | Rogalski | B60W 30/143 701/93 |
| 2014/0378276 A1* | 12/2014 | Wagberg | B60W 10/02 477/174 |
| 2015/0126328 A1* | 5/2015 | Banker | B60W 30/18109 180/65.265 |
| 2015/0151758 A1* | 6/2015 | Yoshino | B60W 10/04 701/54 |
| 2015/0210282 A1* | 7/2015 | Fairgrieve | F16H 61/0213 701/93 |
| 2015/0321671 A1* | 11/2015 | Simmons | B60W 30/143 701/93 |
| 2016/0023657 A1* | 1/2016 | Fairgrieve | B60W 10/04 701/93 |
| 2016/0214596 A1* | 7/2016 | Glugla | B60W 30/188 |
| 2017/0072780 A1* | 3/2017 | White | B60W 10/08 |
| 2017/0072959 A1 | 3/2017 | Bergin | |
| 2017/0203762 A1* | 7/2017 | Khafagy | B60T 7/122 |
| 2017/0291609 A1* | 10/2017 | Reich | B60W 10/06 |
| 2018/0141538 A1* | 5/2018 | Doering | F02D 41/123 |
| 2019/0135249 A1* | 5/2019 | Fridman | F16D 55/226 |
| 2019/0367028 A1* | 12/2019 | Larsson | B60W 30/188 |
| 2020/0130452 A1* | 4/2020 | Rothwell | B60G 17/0165 |
| 2020/0317194 A1* | 10/2020 | Yan | B60W 30/143 |
| 2021/0001852 A1* | 1/2021 | Wishart | B60W 30/182 |
| 2021/0024072 A1* | 1/2021 | Zhao | B60W 10/023 |
| 2021/0402877 A1* | 12/2021 | Velazquez Alcantar | B60K 26/02 |

FOREIGN PATENT DOCUMENTS

| | | | | |
|---|---|---|---|---|
| DE | 102014105676 A1 | * | 10/2014 | B60W 30/18054 |
| GB | 2523193 A | * | 8/2015 | B60W 10/04 |
| GB | 2523194 A | * | 8/2015 | B60W 10/04 |
| WO | WO-9509741 A1 | * | 4/1995 | B60W 10/06 |

* cited by examiner

SYSTEM AND METHOD FOR AUTOMATED OFF-ROAD SPEED CONTROL FOR A VEHICLE

TECHNICAL FIELD

Example embodiments generally relate to vehicle control algorithms and, more particularly, relate to a system and method for providing an off-road driver assistance feature for speed control.

BACKGROUND

Navigating off-road terrain, or rugged trails, can often require coordinated application of both propulsive and braking torque. Traditionally, drivers control wheel speeds under such circumstances by modulating the accelerator and brake pedals simultaneously, which can be difficult to manage for even experienced drivers.

Thus, it may be desirable to develop a driver assistance feature that can be used to automate controlling speed during off-road driving situations for a more satisfying user experience.

BRIEF SUMMARY OF SOME EXAMPLES

In accordance with an example embodiment, a vehicle control system for a vehicle may be provided. The system may include a controller, a user interface and a torque control module. The controller may be operably coupled to components and/or sensors of a vehicle to receive information including vehicle speed. An operator may be enabled to use the user interface to enter a target speed, the target speed, which is provided to the controller. The torque control module may be configured to generate both a propulsive torque request and a braking torque request based on a difference between the target speed and the vehicle speed. The controller may be configured to control vehicle operation in any of a plurality of operator selectable modes of operation. In one of the modes of operation, a low speed correction module may be activated over a selected range of vehicle speeds to automatically provide a variable modification to the propulsive torque request or the braking torque request in response to a trigger event.

In another example embodiment, torque control module of a vehicle control system may be provided. The torque control module may include a propulsive torque determiner configured to determine a propulsive torque request based on accelerator pedal position in a normal mode of operation, and a braking torque determiner configured to determine a braking torque request based on a brake pedal position during the normal mode of operation. In another selectable mode of operation, the torque control module may be configured to generate both a propulsive torque request and a braking torque request based on a difference between a target speed set by an operator and a measured vehicle speed. In the other selectable mode of operation, a low speed correction module that is operably coupled to the torque control module may be activated over a selected range of vehicle speeds to automatically provide a variable modification to the propulsive torque request or the braking torque request in response to a trigger event.

In another example embodiment, a method of providing automated control of vehicle speed in a driver assist mode is provided. The method may include receiving an operator selection of the driver assist mode and a target speed, monitoring vehicle speed, and generating a propulsive torque request and a braking torque request based on a difference between the target speed and the vehicle speed. The method may further include, responsive to vehicle speed being in a selected range from zero to about three miles per hour, initiating a low speed correction to automatically provide a variable modification to the propulsive torque request or the braking torque request.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Figure 1:
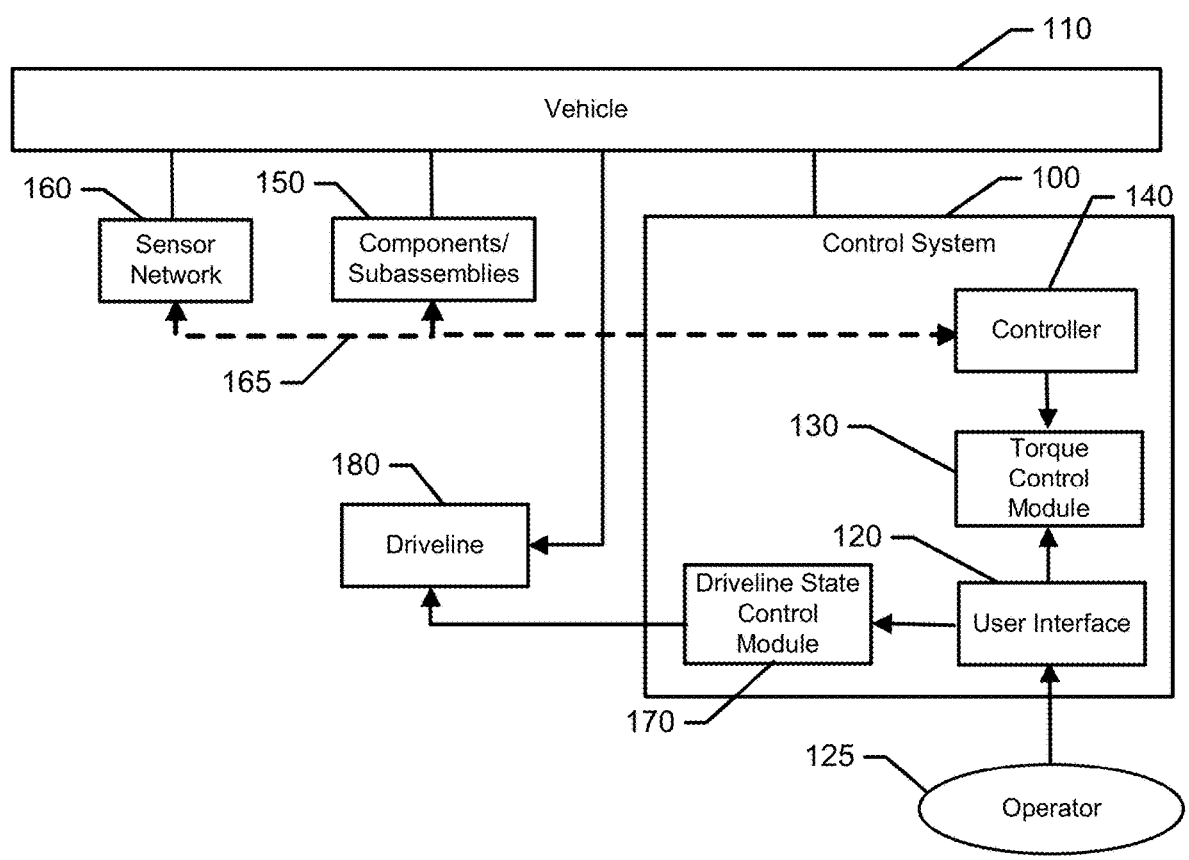
FIG. 1 illustrates a block diagram of a vehicle control system in accordance with an example embodiment.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other.

As noted above, two-pedal driving, or at least driving on terrain with substantial obstacles (e.g., rock-crawling) presents certain challenges. For example, a first challenge posed by this operational context is the need to quickly transition from the significant propulsive force required for a drive wheel to overcome or climb to the apex of an obstacle to the significant brake torque required to prevent overshooting the driver's intended wheel positions after the vehicle as passed the apex and is on the descending side of the obstacle. Another challenge posed by this operational context is the balancing of brake and propulsive torques while launching the vehicle from a standstill position on a large grade, or on the ascending side of a significant obstacle. In this regard, it is typically desirable to enable a smooth forward vehicle motion and minimizing backward motion.

An operator may directly control the brake and propulsive torques through operation of the accelerator and brake pedals. However, it may be desirable to give operators the option to automate some of the functions associated with vehicle control in this context. A familiar automated speed control function is commonly referred to as "cruise control." Generally speaking, cruise control allows the operator to set a target speed (or set point), and then measures current speed to determine an error value by comparing the current and target speeds. The automated speed control function then closes the error value to zero in a continuous feedback loop in order to maintain vehicle speed as close as possible to the target speed. However, within this context, it is known that vehicle load (and perhaps other correction factors) must be considered in order to avoid significant overshoots or undershoots that degrade from the user experience. For example, while climbing a steep grade, increased torque will be added due to the growing error value as the grade increases.

Automated speed control similar to the cruise control example described above may be thought to be usable even for rock-crawling or other off-road driving situations, just with lower target speeds that would be advisable for operation in such contexts. However, cruise control typically controls only propulsive torque, and off-road driving situations require a combination of propulsive and braking torque to ensure that roll-back is prevented (e.g., if the vehicle fails to climb over an obstacle), and that the overall experience is optimized.

To address this situation, many vehicle manufacturers have provided vehicle control systems capable of operating in off-road operational contexts by automating certain aspects of vehicle control. However, even these vehicle control systems, which are designed to control both propulsive and braking torque for off-road driving may face particular challenges that remain difficult to overcome. For example, at very low speeds (e.g., from 0 to 3 mile per hour (mph), it can be difficult to control vehicle speed. In this regard, wheel speed signals may have lower resolution in the very low speed range, and the error signals generated in this range are also very small. Thus, the vehicle could actually be stopped in some cases before a large enough error is generated to initiate certain actions.

Given that the very low speed range (e.g., up to 3 mph) is actually a speed range where customers are most likely to operate in the most challenging of off-road environments (e.g., rock-crawling), it is important to focus on improving operation in this region in order to avoid unwanted speed oscillations and any instances of roll-back when failing to traverse a grade or obstacle. It may also be desirable to control changes in driveline states while the vehicle control system described above is active.

Some example embodiments described herein may provide a driver assistance feature that can control the net torque applied at the wheels of the vehicle in order to control the wheel speeds, but include speed control strategies that also operate well at low speeds. Some example embodiments may therefore provide a control system that allows the driver to select automated speed control for off-road driving conditions, and such speed control may initiate specific strategies that improve performance in the most challenging of situations that are likely to be encountered. As such, some example embodiments may provide an improved system for vehicle control that can yield benefits in both customer confidence and vehicle capability. As a result, vehicle performance and driver satisfaction may also be improved.

FIG. 1 illustrates a block diagram of a control system 100 of an example embodiment. The components of the control system 100 may be incorporated into a vehicle 110 (e.g., via being operably coupled to a chassis of the vehicle 110, various components of the vehicle 110 and/or electronic control systems of the vehicle 110). Of note, although the components of FIG. 1 may be operably coupled to the vehicle 110, it should be appreciated that such connection may be either direct or indirect. Moreover, some of the components of the control system 100 may be connected to the vehicle 110 via intermediate connections to other components either of the chassis or of other electronic and/or mechanical systems or components.

The control system 100 may have a normal mode of operation that includes an input device in the form of control pedals. The pedals may include a brake pedal and an accelerator pedal pivotally mounted to the floor of the vehicle 110, and operable by an operator 125. The brake pedal may generally be used to provide inputs for control of braking torque, and the accelerator pedal may be used to provide inputs for control of propulsive torque. However, the normal mode of operation may not be desirable for all cases. Moreover, selectable other modes of operation, including one or more off-road driver assistance modes may also exist. Accordingly, the control system 100 of some example embodiments may further include a user interface 120. The operator 125 may operate the user interface 120, which may include or define a mode selector to shift out of the normal mode of operation and into any of the other modes of operation. In one example embodiment, the other modes of operation that can be selected by the operator 125 via the user interface 120 may include an off-road driver assistance mode. Of note, although the term off-road driver assistance mode will generally be referred to herein as being the mode in which example embodiments are performed, the name of the mode in which example embodiments may be applied is not important, and certainly not limiting. Other terms like trail control mode, or any other descriptive terms for a mode in which the functionality described herein is applied, are also possible.

In the off-road driver assistance mode, the pedals may not be the primary source of input for controlling operation of the vehicle 110. The pedals may either be disabled or may be enabled to provide additive input relative to automatic control that may be initiated by a torque control module 130 of the control system 100 as described in greater details below.

Accordingly, the control system 100 of example embodiments may also include the torque control module 130, which may be part of or otherwise operably coupled to a controller 140. The torque control module 130 may be configured to determine net torque as described herein based on inputs from any or all of the controller 140, the user interface 120 or other components of the vehicle 110. In some cases, the controller 140 may be part of an electronic control system of the vehicle 110 that is configured to perform other tasks related or not related to propulsive and braking control or performance management. However, the controller 140 could be a dedicated or standalone controller in some cases.

In an example embodiment, the controller 140 may receive information that is used to determine vehicle status from various components or subassemblies 150 of the vehicle 100. Additionally or alternatively, various sensors that may be operably coupled to the components or subassemblies 150 may be included, and may provide input to the controller 140 that is used in determining vehicle status. Such sensors may be part of a sensor network 160 and sensors of the sensor network 160 may be operably coupled to the controller 140 (and/or the components or subassemblies 150) via a vehicle communication bus (e.g., a controller area network (CAN) bus) 165.

The components or subassemblies 150 may include, for example, a brake assembly, a propulsion system and/or a wheel assembly of the vehicle 110. The brake assembly may be configured to provide braking inputs to braking components of the vehicle 110 (e.g., friction brakes and electrical methods of braking such as regenerative braking) based on a braking torque determined by the controller 140 and/or torque control module 130. The propulsion system may include a gas engine, electric motor, or any other suitable propulsion device. The controller 140 and/or torque control module 130 may be configured to determine propulsive torque inputs for provision to the propulsion system to apply propulsive torque to the wheels of the wheel assembly of the vehicle 110. Moreover, one or more corresponding sensors of the sensor network 160 that may be operably coupled to the brake assembly and/or the wheel assembly may provide information relating to brake torque, brake torque rate, vehicle velocity, vehicle acceleration, front/rear wheel speeds, vehicle pitch, etc. Other examples of the components or subassemblies 150 and/or corresponding sensors of the sensor network 160 may provide information relating to yaw, lateral G force, throttle position, selector button positions associated with chassis and/or vehicle control selections, etc.

Accordingly, for example, the controller 140 may be able to receive numerous different parameters, indications and other information that may be related to or indicative of different situations or conditions associated with vehicle status. The controller 140 may also receive information indicative of the intent of the operator 125 relative to control of various aspects of operation of the vehicle 110 and then be configured to use the information received in association with the execution of one or more control algorithms that may be used to provide instructions to the torque control module 130 in order to control application of net torque to the wheels of the wheel assembly of the vehicle 110.

In an example embodiment, the operator 125 may use the user interface 120 to select the off-road driver assistance mode and define a target speed at which the vehicle 110 should operate for off-road driving under automated speed control. Such selection may correspondingly activate the torque control module 130 to provide the automated speed control based on information provided by the components or subassemblies 150 and/or corresponding sensors of the sensor network 160 based on the error measured between the current speed and the target speed. Operation of the torque control module 130 will be described in greater detail below in reference to FIG. 2.

As noted above, when the torque control module 130 is active, and automated controls have been selected, it may also be desirable to control (or limit) changes in driveline state. A driveline state control module 170 may therefore be included in order to provide information to the torque control module 130 to protect a driveline 180 of the vehicle 110. In this regard, for example, the driveline 180 may include front and rear axles, drive components for the front and rear axles and/or the components that provide coupling therebetween. Thus, for example, the driveline 180 may include gears and/or clutch components that operably couple the front and rear axles (and/or their driving components).

In an example embodiment, the driveline state control module 170 may interface with the torque control module 130 in order to monitor conditions (including the direction associated with vehicle speed) when a driveline state change is requested by the operator 125 while the torque control module 130 is active. In particular, the driveline state control module 170 may be configured to provide information to the torque control module 130 to enable the torque control module 130 to evaluate such information and, if necessary or appropriate, reduce propulsive torque during the state shift while the driveline state control module 170 monitors the direction associated with vehicle speed. If the direction changes (i.e., if the speed direction goes from forward or positive to rearward or negative), then braking torque may be applied until the vehicle 110 is stopped. While stopped, and held at the stopped condition, the state change may proceed. When the state change is completed, the torque control module 130 may resume normal operation. Moreover, if the speed direction never changes, the vehicle 110 will also not be directed to stop, and continued propulsive torque (albeit at a reduced value) may be applied until the state change is completed.

Figure 2:
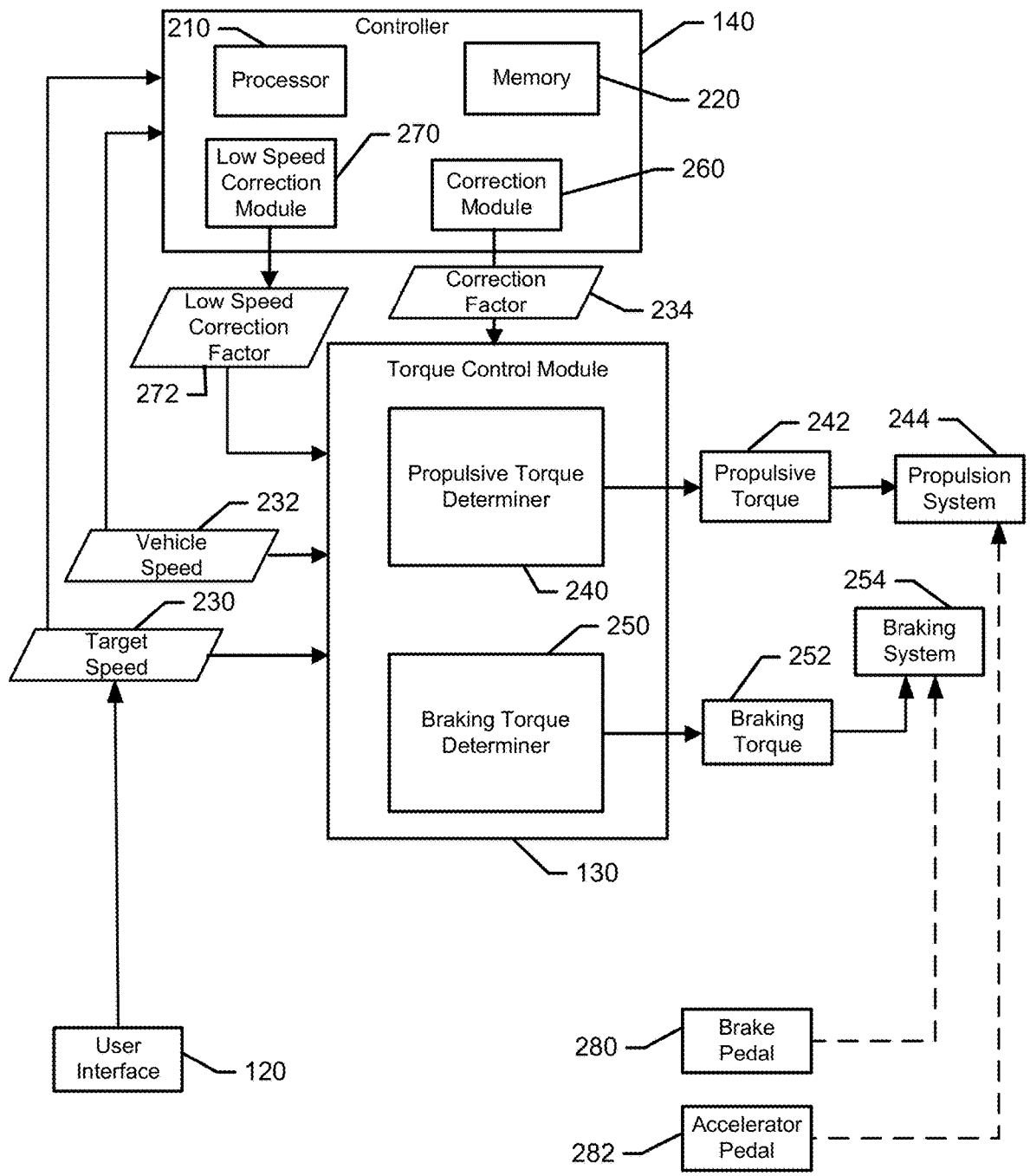
FIG. 2 illustrates a block diagram of some components of the vehicle control system of FIG. 1 in accordance with an example embodiment.

Referring now to FIG. 2, operation of the controller 140 and the torque control module 130 will be described in greater detail. FIG. 2 illustrates a block diagram of various components of the control system 100 in greater detail. In this regard, for example, FIG. 2 illustrates example interactions between the controller 140 and the torque control module 130 relative to information received thereby (e.g., from the sensor network 160, from various ones of the components/subassemblies 150, and/or from the user interface 120). Processing circuitry (e.g., a processor 210 and memory 220) at the controller 140 may process the information received by running one or more control algorithms. The control algorithms may include instructions that can be stored by the memory 220 for retrieval and execution by the processor 210. In some cases, the memory 220 may further store one or more tables (e.g., look up tables) and various calculations and/or applications may be executed using information in the tables and/or the information as described herein.

The processor 210 may be configured to execute the control algorithms in series or in parallel. However, in an example embodiment, the processor 210 may be configured to execute multiple control algorithms in parallel (e.g., simultaneously) and substantially in real time. The control algorithms may be configured to perform various calculations based on the information received/generated regarding specific conditions of vehicle components. The control algorithms may therefore execute various functions based on the information received, and generate outputs to drive the control of net torque applied at the wheels of the vehicle 110. The torque control module 130 may itself be a control algorithm, or may include control algorithms in the form of functional modules (or sub-modules) configured to perform specific functions for which they are configured relating to control of the vehicle 110 in the manner described herein. Thus, for example, the controller 140 may actually function as the torque control module 130 responsive to executing the control algorithms. However, in other cases, the torque control module 130 may be a component or module of the controller 140, or an entirely separate component (e.g., possibly also including its own corresponding processing circuitry).

In an example embodiment, the information upon which the control algorithms operate may include a target speed 230. In this regard, the target speed 230 may be selected by the operator 125 via the user interface 120 of FIG. 1, and may then be provided to the torque control module 130 and/or controller 140 for use as described in greater detail below. The information upon which the control algorithms operate may also include vehicle speed 232. Vehicle speed 232 may be provided from a speedometer of the vehicle 110, from global positioning system (GPS) information, or any other suitable source including detectors capable of measuring wheel speed for each individual one of the wheels of the vehicle 110.

In an example embodiment, the torque control module 130 may be configured to include a propulsive torque determiner 240. In general, the propulsive torque determiner 240 may be configured to receive information (e.g., including target speed 230, vehicle speed 232, and a correction factor 234) in order to determine a propulsive torque 242 to be applied to a propulsion system 244 of the vehicle 110 (e.g., a gasoline engine, electric motor, and/or the like). In other words, propulsive torque 242 may be considered to be representative of a propulsive torque request, or a request for a corresponding determined amount of propulsive torque.

In an example embodiment, the torque control module 130 may also be configured to include a braking torque determiner 250. In general, the braking torque determiner 250 may be configured to receive information (e.g., including target speed 230, vehicle speed 232, and the correction factor 234) in order to determine a braking torque 252 to be applied to a braking system 254 of the vehicle 110. In other words, braking torque 252 may be considered to be representative of a braking torque request, or a request for a corresponding determined amount of braking torque.

In an example embodiment, the controller 140 (and/or the torque control module 130) may be configured to determine an error or difference value based on comparing the vehicle speed 232 to the target speed 230, and may control the application of the propulsive torque 242 to the propulsion system 244 and the braking torque 252 to the braking system 254 based on the error signal. However, this simple control system tends to oscillate too much. Accordingly, the controller 140 (and/or the torque control module 130) may be configured as a PID (proportional-integral-derivative) controller that is further configured to apply the correction factor 234 to the differences otherwise determined. The correction factor 234 may be determined based on proportional, integral and derivative terms and may be the same or different for corresponding propulsive torque 242 or braking torque 252 calculations.

Accordingly, for example, the propulsive torque determiner 240 and/or the braking torque determiner 250 may be configured to determine the propulsive torque 242 and/or the braking torque 252, respectively, via error calculations that are modified based on the correction factor 234. Additionally or alternatively, a propulsive torque map or a braking torque map may be constructed and used to balance the information indicative received in order to infer the desired propulsive torque and/or desired braking torque. In an example embodiment, such maps may define nominal values of error and provide corresponding torque values prior to adjustment based on the correction factor 234 (and/or other information or variables that may be provided by the sensor network 160 and/or various ones of the components/subassemblies 150.

In an example embodiment, the correction factor 234 may be generated by a correction module 260. The correction module 260 may be any means such as a device or circuitry embodied in either hardware, or a combination of hardware and software that is configured to perform the corresponding functions of the correction module 260 at least with respect to generation of the correction factor 234. As noted above, the correction factor 234 may incorporate proportional, integral and derivative terms. One issue that arises at low speeds is that the error (e.g., between the vehicle speed 232 and the target speed 230) is so low by virtue of the small magnitudes of the speed values, that it may be possible for the vehicle 110 to come to a stop prior to generating an actionable error value. In a typical situation, simply adjusting gain values for the correction factor 234 may address this issue. However, adjusting gains upward for values in this region may result in excessive oscillations in speed and may even cause or fail to prevent roll-back situations. Thus, some additional action may be advisable.

Accordingly, example embodiments may employ a low speed correction module 270 that is configured to operate only at low speeds, and to provide improved performance in this operating range without performing gain adjustments to the proportional, integral and/or derivative terms. In some example embodiments, the low speed correction module 270 may be configured to generate a low speed correction factor 272 that provides compensation similar to the correction factor 234, but is only applicable at the low speed range during which the low speed correction module 270 is active. As can be appreciated by this description, the controller 140 may therefore use the vehicle speed 232 as a selection criteria for activation the low speed correction module 270. The correction module 260 may therefore always be active in accordance with the programming and configuration assigned thereto. Meanwhile, in the low speed operating range (e.g., 0 to about 3 mph), the low speed correction module 270 may be activated in order to operate in parallel with the correction module 260 (or in series therewith). Accordingly, for example, the low speed correction module 270 may be configured to provide the low speed correction factor 272 directly to the torque control module 130 for generation of propulsive torque 242 and/or braking torque 244 as shown in FIG. 2. However, in some alternatives, the low speed correction factor 272 could instead be applied to the correction module 260 to modify the correction factor 234 or influence generation of the correction factor 234. In such an example, the correction factor 234 may be understood to have been modified from the value normally generated by the correction module 260 based on application of the low speed correction factor 272 from the low speed correction module 270.

In an example embodiment, the low speed correction module 270 may be configured to perform one or more low speed control strategies, each of which may cause the low speed correction factor 272 to be generated to apply changes to torque values output by one or both of the propulsive torque determiner 240 and the braking torque determiner 250. The low speed control strategies may include application of a brake torque overlay, a low speed torque correction, and an obstacle build term (or zero speed torque correction), which will be described in greater detail below. As such, the low speed correction module 270 may automatically operate over a selected range of speeds (e.g., up to 3 mph) when in an operator-selected mode for which such automated operation is requested. The operator-selected mode may be an option instead of a normal mode of operation in which the brake torque request for the braking system 254 is provided (directly or via the brake torque determiner 250) by a brake pedal 280. Similarly, in the normal mode, the propulsive torque request for the propulsion system 244 may be provided (directly or via the propulsive torque determiner 240) by an accelerator pedal 282.

Figure 3:
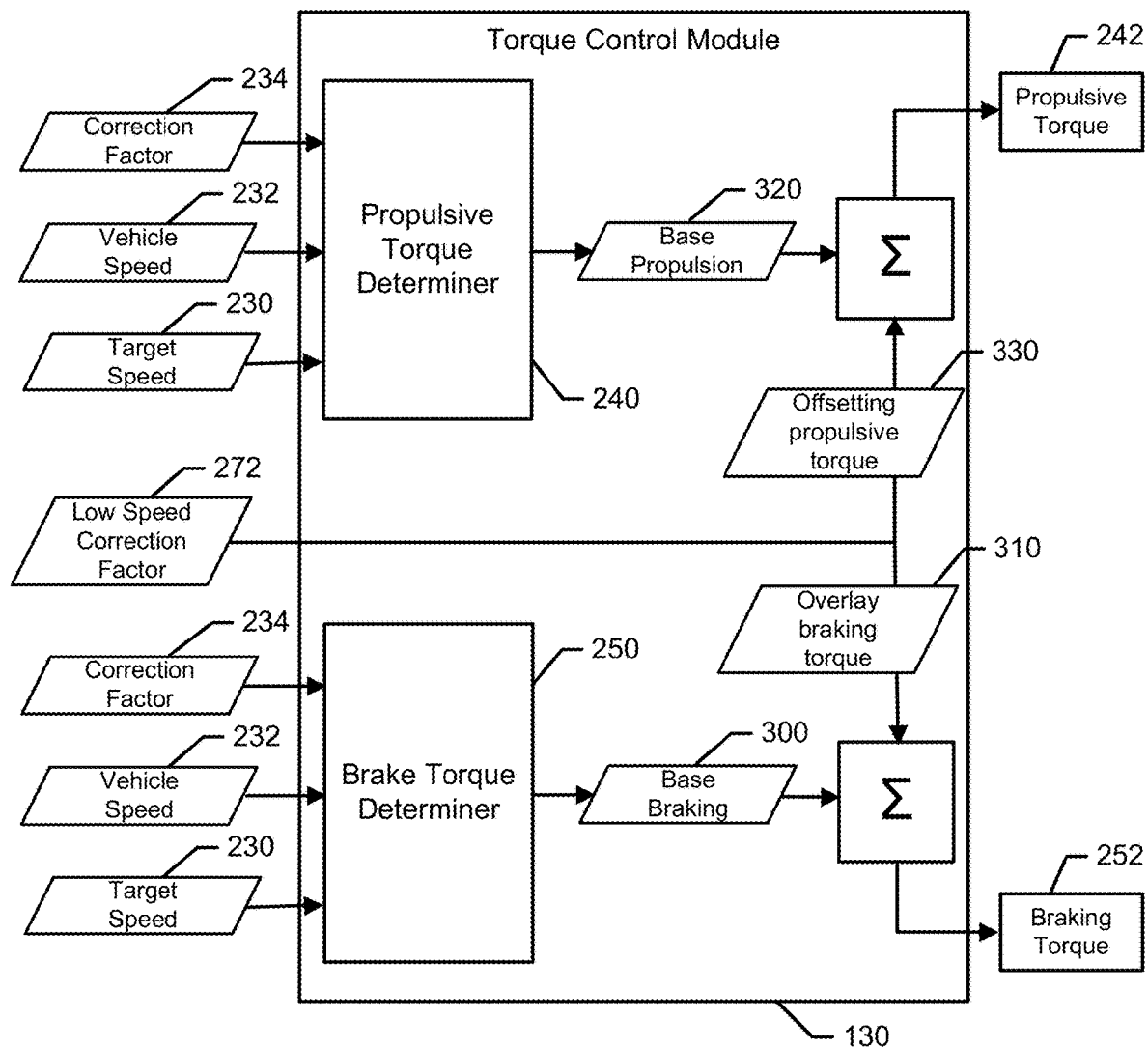
FIG. 3 illustrates the vehicle control system providing an overlay braking torque at low speeds in accordance with an example embodiment.

FIG. 3 illustrates a block diagram of an example in which the application of brake torque overlay is employed. In an example embodiment, the application of the brake torque overlay may include the overlaying of a small amount of brake torque with an offsetting increase in propulsion torque to the base values otherwise generated by the brake torque determiner 250 and the propulsive torque determiner 240, respectively. In other words, the value generated as the braking torque 252 may include a base braking value 300 determined by the brake torque determiner 250 based on normal operation of the torque control module 130 (i.e., without operation of the low speed correction module 270, or only with the correction factor 234 applied) plus an overlay braking torque 310 generated by the low speed correction module 270. Meanwhile, the value generated as the propulsive torque 242 may include the base propulsion value 320 determined by the propulsive torque determiner 240 based on normal operation of the torque control module 130 (i.e., without operation of the low speed correction module 270, or only with the correction factor 234 applied) plus an offsetting propulsive torque 330 generated by the low speed correction module 270.

The overlay braking torque 310 and the offsetting propulsive torque 330 may cancel each other out in net effect. However, the existence of the overlay braking torque 310 ensures that there is a baseline or existing brake force always applied so that, for example, if the vehicle 110 should start to roll-back, there is no delay in application of brake torque since the overlay braking torque 310 is already being applied. The brake torque overlay strategy may therefore reduce the need to switch quickly between the calculated and produced values for propulsive torque 242 and braking torque 252, which could have some delay associated therewith. In this regard, since the braking torque 252 is always in opposition to the direction of motion of the vehicle 110 (whether forward or reverse), the overlay braking torque 310 instantaneously switches direction if the vehicle 110 experiences a change in direction (which may happen in a roll-back scenario). Since the overlay braking torque 310 is already present, roll-back may be opposed and either significantly reduced or even prevented.

Figure 4:
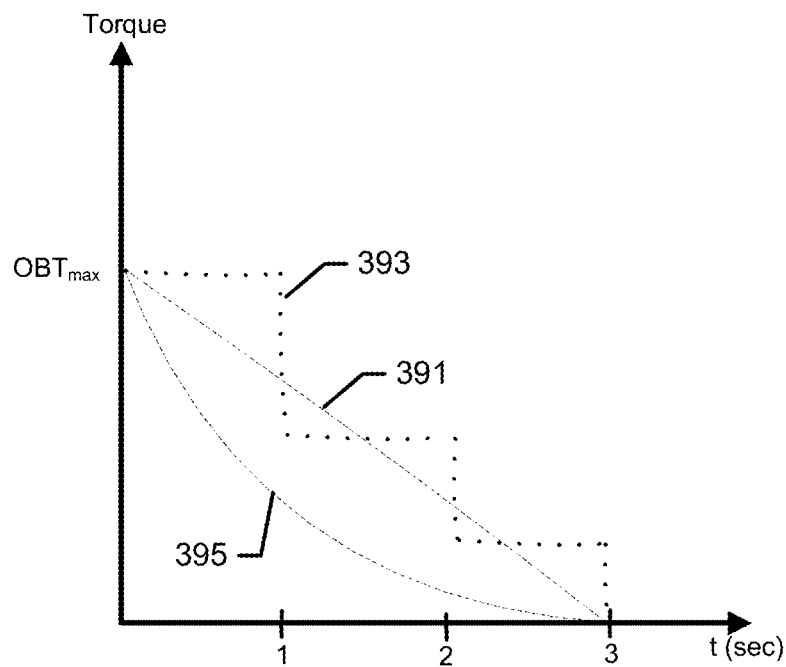
FIG. 4 illustrates a plot of torque versus time for the overlay braking torque of an example embodiment.

In an example embodiment, the low speed correction module 270 may have a table or set of mapped values that correspond to respective different speeds, or may be a constant value that is linearly (or nonlinearly) reduced from a low end of the speed range over which the overlay braking torque 310 is applicable (e.g., 0 to 3 mph) to the high end of the speed range. Thus, for example, if the maximum value (OBT$_{max}$) for the overlay braking torque 310 is applied at a speed of 0 mph, the value of overlay braking torque 310 may linearly decrease from OBT$_{max}$ to 0 over the range of speeds from 0 mph to 3 mph. FIG. 4 illustrates three respective different control paradigms for the overlay braking torque 310 including linear control 391, step control 393, and non-linear control 395.

Figure 5:
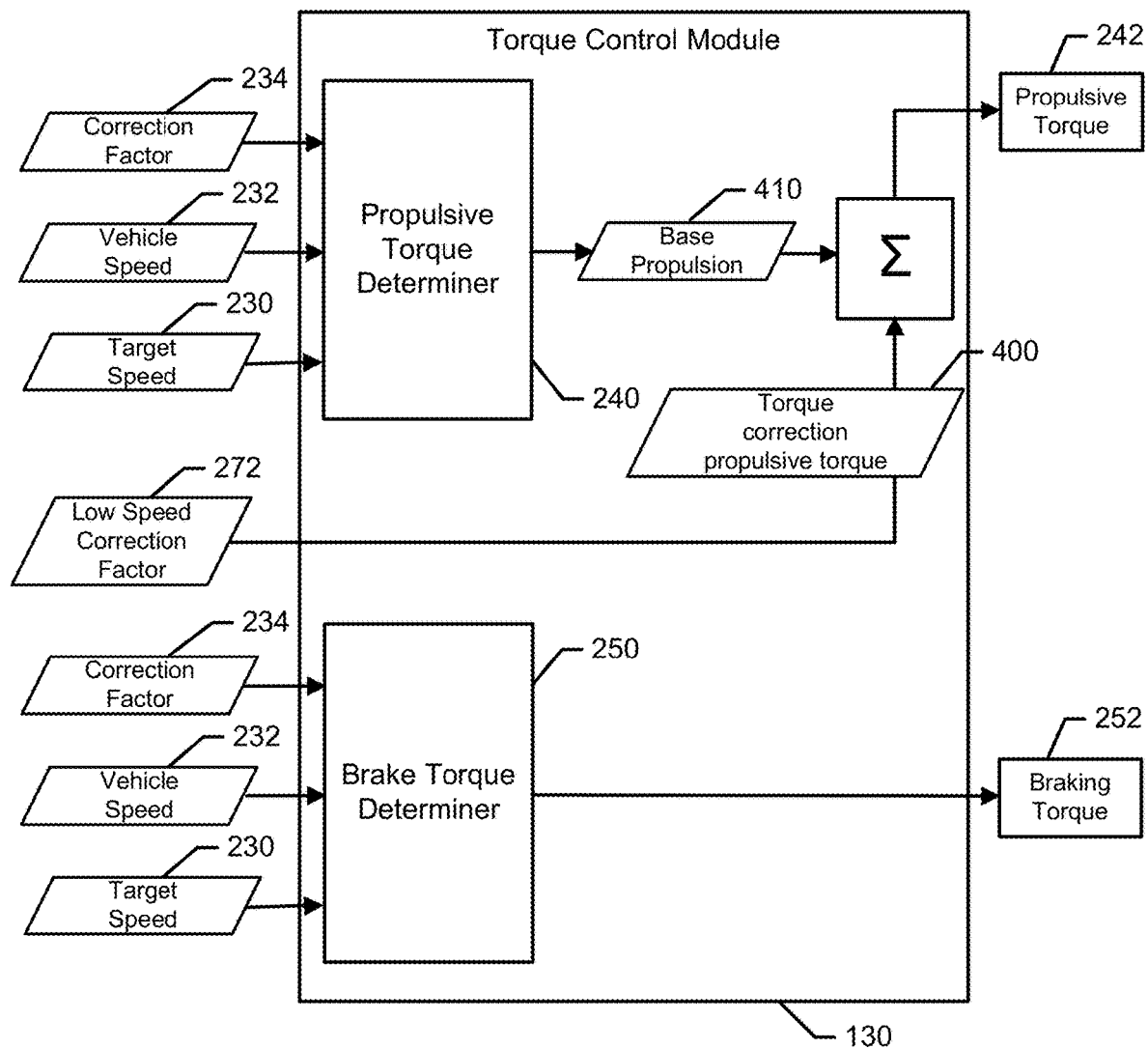
FIG. 5 illustrates the vehicle control system providing a torque correction propulsive torque at low speeds in accordance with an example embodiment.

FIG. 5 illustrates a block diagram of an example in which the application of low speed torque correction (e.g., a torque boost or spring at low speeds) is employed. In an example embodiment, the application of low speed torque correction may also be provided to have a decreasing effect over the range of speeds for which the low speed torque correction is applicable (e.g., 0 to 1 mph) as speed increases. In other words, low speed torque correction may be a maximum closer to zero speed, and may decrease (e.g., linearly or non-linearly) over the range of speeds to which low speed torque correction applies.

Given that only small speed errors are generated before the vehicle 110 comes to a stop at very low speeds, and that it is undesirable to simply increase gain values as discussed above, the low speed torque correction may directly address this situation in a positive way. In this regard, for example, the low speed torque correction may add a positive propulsive torque value as the vehicle speed approaches zero, where speed resolution is relatively poor. The low speed torque correction may therefore allow for smoother control at minimum set speeds, and may also minimize vehicle stopping, which negatively impacts the user experience.

In some examples, as shown in FIG. 5, the low speed correction factor 272 may be embodied as or otherwise include a torque correction propulsive torque 400 or torque correction boost that is added to the output of the propulsive torque determiner 240 so that the low speed torque correction effectively introduces a boost to the value generated as the propulsive torque 242 based on normal operation of the torque control module 130 (i.e., without operation of the low speed correction module 270, or only with the correction factor 234 applied). The propulsive torque 242 that is generated during operation of the low speed correction module 270 may therefore include a base propulsion value 410 determined by the propulsive torque determiner 240 normally plus the torque correction propulsive torque 400 generated by the low speed correction module 270.

Figure 6:
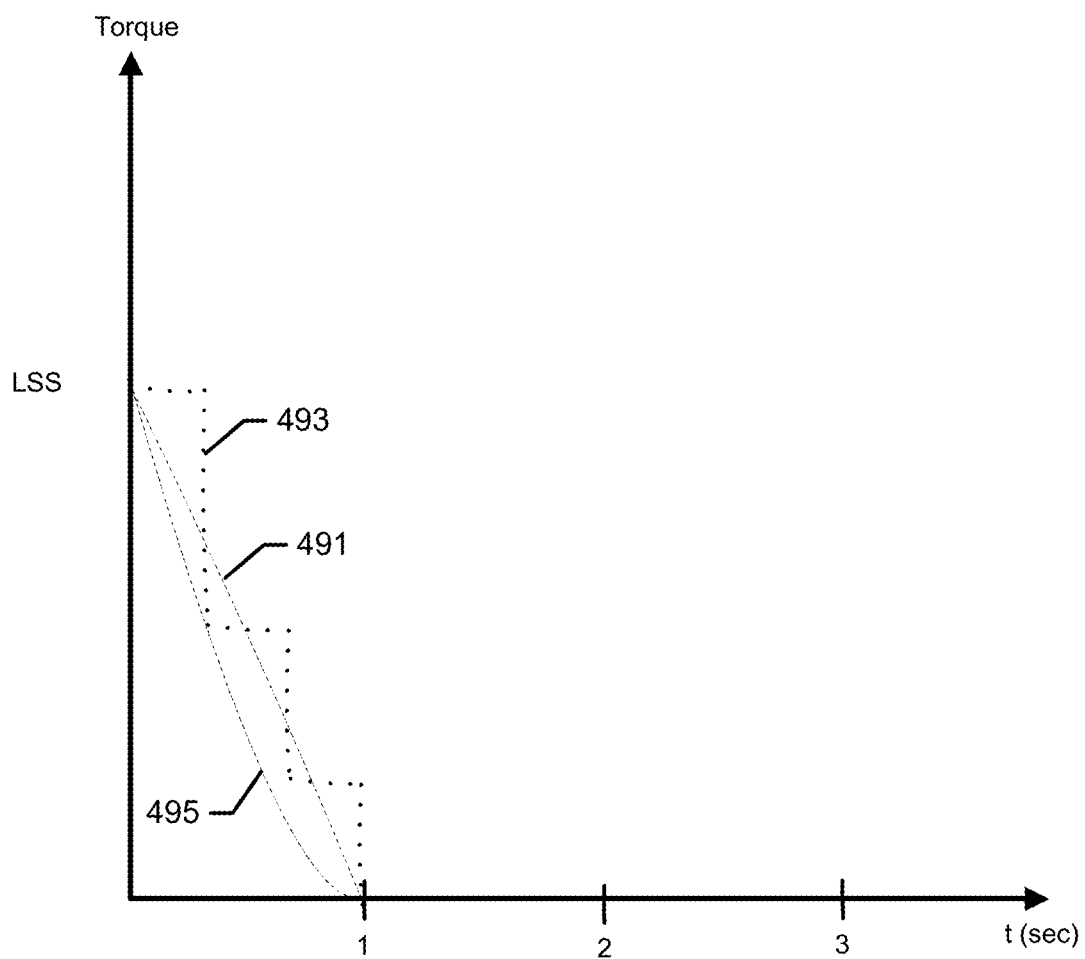
FIG. 6 illustrates a plot of torque versus time for the torque correction propulsive torque of an example embodiment.

In an example embodiment, the low speed correction module 270 may define the low speed torque correction based on a table or set of mapped values that correspond to respective different speeds, or may be a constant value that is linearly (or nonlinearly) reduced from a low end of the speed range over which the low speed torque correction is applicable (e.g., 0 to 1 mph) to the high end of the speed range. Thus, for example, if the maximum value (LSS) for the torque correction propulsive torque 400 is applied at a speed of 0 mph, the value of torque correction propulsive torque may linearly decrease from LSS to 0 over the range of speeds from 0 mph to 1 mph. FIG. 6 illustrates three respective different control paradigms for the torque correction propulsive torque 400 including linear control 491, step control 493, and non-linear control 495.

As can be appreciated from the examples of FIGS. 3-6, the low speed torque correction may be applied over a smaller range of speeds (e.g., 0 to 1 mph) than the range of speeds over which the brake torque overlay is applied (e.g., 0 to 3 mph). Thus, the low speed torque correction may be applied less often than the brake torque overlay. Moreover, in some cases, although both the low speed torque correction and the brake torque overlay could be independently applied in a mutually exclusive fashion, it is also contemplated that the low speed torque correction and the brake torque overlay may be applied simultaneously. As such, the feedback loop for matching vehicle speed 232 to the target speed 230 may include compensation for both of these effects simultaneously.

Figure 7:
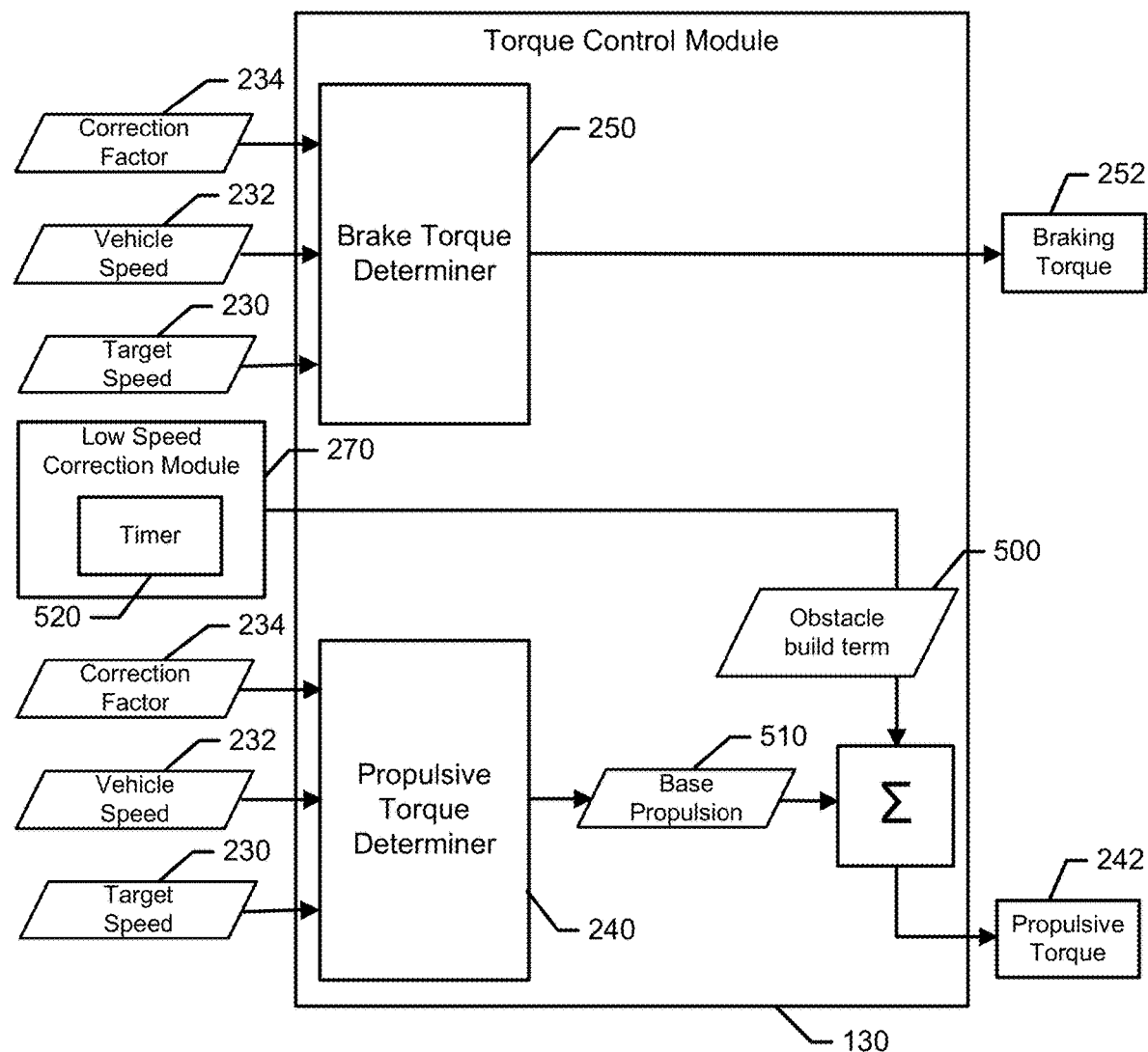
FIG. 7 illustrates the vehicle control system providing a correction associated with an obstacle build term at low speeds in accordance with an example embodiment.
Figure 8:
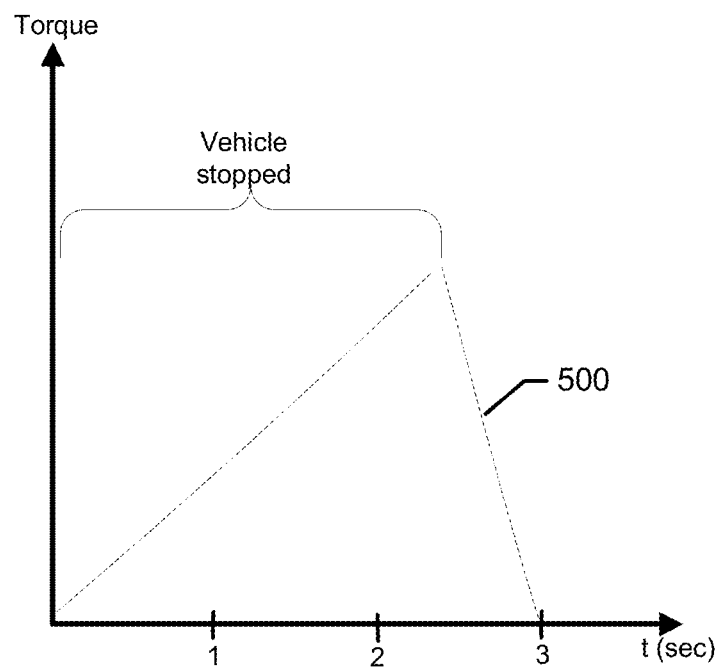
FIG. 8 illustrates a plot of torque versus time for the obstacle build term of an example embodiment.

In an example embodiment, the obstacle build term 500 may also be added to modify operation of the torque control module 130 as shown in FIG. 7. The obstacle build term 500 (which may also be referred to as a zero speed torque correction) may address the challenge of encountering a steep grade (e.g., a curb, rock, prominent object or other obstacle). In this regard, for example, when the wheel of the vehicle 110 encounters the steep grade (or object) and progress in traversing the grade or object slows or stops, it is undesirable to allow a roll-back. To avoid the roll-back, it may be advisable to increase propulsive torque for any period of time during which the vehicle 110 is stopped. The propulsive torque 242 may therefore increase, the longer the vehicle 110 is stopped. To achieve this result, the obstacle build term 500 may be added to a base propulsion value 510 otherwise determined by the propulsion torque determiner 240 and added thereto. Moreover, the obstacle build term 500 (which may act as a type of integral term that increases with time) may build slowly over time, and decay away rapidly after the vehicle 110 is no longer stopped, as shown in FIG. 8. As such, a timer 520 may be included in the low speed correction module 270 to measure the time over which the vehicle 110 is stopped. The low speed correction module 270 may be configured to generate the obstacle build term 500 to build slower than it decays or ramps out. This slow build up and rapid decay feature of the obstacle build term 500 may help to avoid overshooting when the vehicle 110 overcomes the grade or obstacle. The obstacle build term 500 may be applied independent of or simultaneously with the application of low speed torque correction and brake torque overlay. In some cases, braking torque may also be applied to bring the vehicle 110 to a stop any time a direction of motion opposite the target is sensed while the system is active. In some examples, a torque reduction (e.g., in response to a driveline state change) may also be seen as a trigger condition. Braking may therefore be applied until propulsive torque is high enough to move the vehicle 110 in the intended direction of travel.

As can be appreciated from the descriptions above, the overlay braking torque 310 (including the corresponding propulsive offset), the torque correction propulsive torque 400 and the obstacle build term 500 are each examples of a variable modification to a propulsive torque request or a braking torque request that is issued by the propulsive torque determiner 240 and/or the brake torque determiner 250 in response to a trigger event. The trigger events all occur over the range of operation of the low speed correction module 270 (e.g., 0-3 mph) automatically when the corresponding trigger event is detected within that range of speeds, while in the corresponding operator selectable mode (i.e., the trail control mode, or off-road driver assistance mode).

As noted above, the control algorithms described above (and potentially others as well) may be executed in parallel and in real time by the controller 140. The execution of the control algorithms in parallel with each other may result in multiple potentially different directions (i.e., increasing/decreasing) and magnitudes of torque requests. Accordingly, the propulsive torque 242 and the braking torque 252 may combine to define a net torque value that dictates how the vehicle 110 operates at each instant in time.

Example embodiments may therefore enable full control of the net torque request made of the vehicle 110 for many different situations when a mode selection is made to operate in the trail control mode, or off-road driver assistance mode, and operation occurs in the low speed range (e.g., 0 to 3 mph). Example embodiments may therefore provide operators with the ability to select boosted operational capabilities for optimal off-road driving capability that can enhance driver confidence and vehicle capabilities. Example embodiments may also enable the user or manufacturers to have the ability to configure various aspects of the user experience by changing various parameters relating to propulsive control, brake control, trigger events, the variable modifications, etc.

Figure 9:
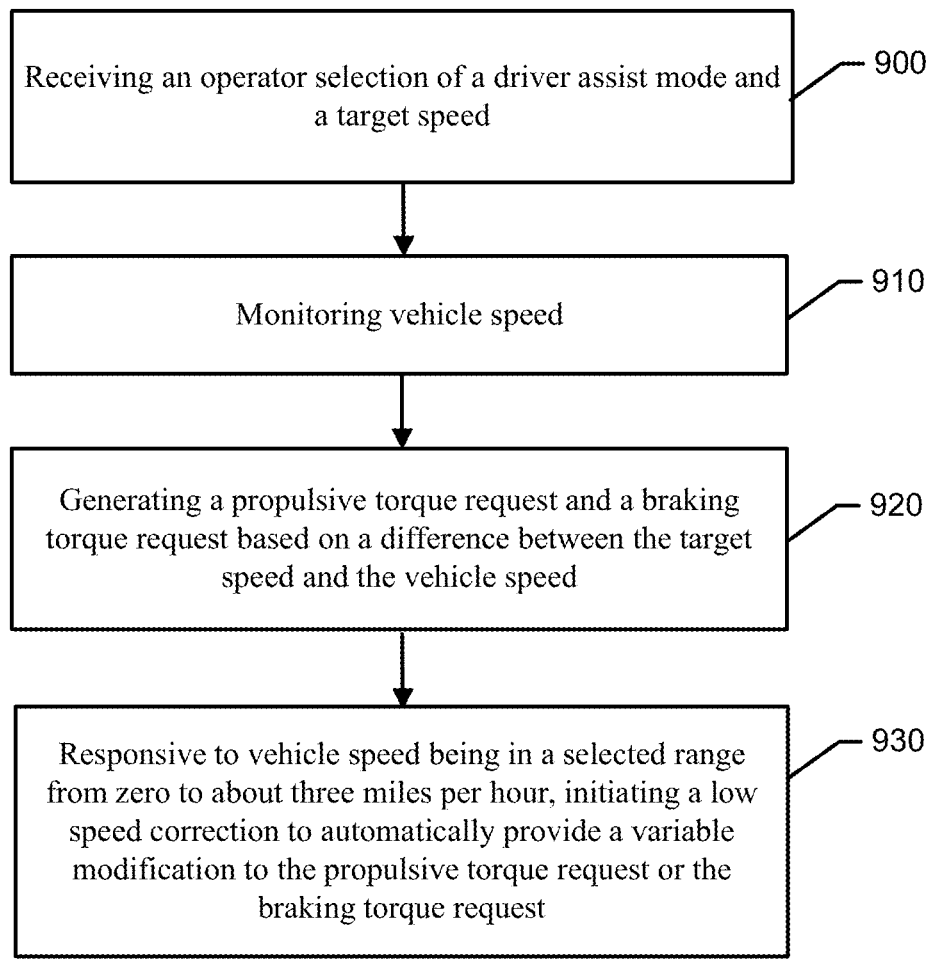
FIG. 9 illustrates a method of controlling a vehicle in accordance with an example embodiment.

FIG. 9 illustrates a block diagram of one example method of providing automated control of vehicle speed in a driver assist mode (e.g., an off-road driver assist mode) is provided. The method may include receiving an operator selection of the driver assist mode and a target speed at operation 900, monitoring vehicle speed at operation 910, and generating a propulsive torque request and a braking torque request based on a difference between the target speed and the vehicle speed at operation 920. The method may further include, responsive to vehicle speed being in a selected range from zero to about three miles per hour, initiating a low speed correction to automatically provide a variable modification to the propulsive torque request or the braking torque request at operation 930.

Example embodiments may therefore also include a vehicle control system, which may include a controller, a user interface and a torque control module. The controller may be operably coupled to components and/or sensors of a vehicle to receive information including vehicle speed. An operator may be enabled to use the user interface to enter a target speed, the target speed, which is provided to the controller. The torque control module may be configured to generate both a propulsive torque request and a braking torque request based on a difference between the target speed and the vehicle speed. The controller may be configured to control vehicle operation in any of a plurality of operator selectable modes of operation. In one of the modes of operation, a low speed correction module may be activated over a selected range of vehicle speeds to automatically provide a variable modification to the propulsive torque request or the braking torque request in response to a trigger event.

The system of some embodiments may include additional features, modifications, augmentations and/or the like to achieve further objectives or enhance performance of the system. The additional features, modifications, augmentations and/or the like may be added in any combination with each other. Below is a list of various additional features, modifications, and augmentations that can each be added individually or in any combination with each other. For example, the torque control module may include a propulsive torque determiner configured to determine the propulsive torque request and a braking torque determiner configured to determine the braking torque request. The trigger event may include the vehicle speed being in the selected range from zero to a first threshold speed. In an example embodiment, the variable modification may be a maximum value at zero and may reduce to zero by the first threshold speed. In some cases, the variable modification reduces to zero by a second threshold speed that is less than the first threshold speed. In an example embodiment, the first threshold speed may be about three miles per hour and the second threshold speed may be about one mile per hour, and the variable modification may include a torque correction propulsive torque added to a base propulsion torque determined by the propulsive torque determiner. In some cases, the variable modification may include an overlay braking torque added to a base braking torque determined by the brake torque determiner, and an offsetting propulsive torque added to a base propulsion torque determined by the propulsive torque determiner. In an example embodiment, the trigger event may include vehicle stopping, and the variable modification may include an obstacle build term that includes a torque boost value that increases as time stopped increases. In some cases, the obstacle build term may decrease responsive to vehicle motion at a faster rate than a rate of increase during the time stopped. In an example embodiment, the system may further include a driveline state control module that is operably coupled to the torque control module to indicate conditions necessary to reduce the propulsive torque request and monitor a direction of vehicle speed responsive to a driveline state change request while in the one of the modes of operation. In some cases, the driveline state control module may be configured to instruct the torque control module to apply braking torque to stop the vehicle responsive to a change of direction in vehicle speed until the state change is complete.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A vehicle control system comprising:
    a controller operably coupled to components and/or sensors of a vehicle to receive information including vehicle speed;
    a user interface via which an operator is enabled to enter a target speed, the target speed being provided to the controller; and
    a torque control module configured to generate both a propulsive torque request and a braking torque request based on a difference between the target speed and the vehicle speed,
    wherein the controller is configured to control vehicle operation in any of a plurality of operator selectable modes of operation, and
    wherein, in one of the operator selectable modes of operation, a low speed correction module is activated over a selected range of vehicle speeds to automatically provide a variable modification to the propulsive torque request or the braking torque request in response to a trigger event.

2. The vehicle control system of claim 1, wherein the torque control module comprises a propulsive torque determiner configured to determine the propulsive torque request and a braking torque determiner configured to determine the braking torque request, and
    wherein the trigger event comprises the vehicle speed being in the selected range from zero to a first threshold speed.

3. The vehicle control system of claim 2, wherein the variable modification is a maximum value at zero and reduces to zero by the first threshold speed.

4. The vehicle control system of claim 3, wherein the variable modification reduces to zero by a second threshold speed that is less than the first threshold speed.

5. The vehicle control system of claim 4, wherein the first threshold speed is about three miles per hour and the second threshold speed is about one mile per hour, and
    wherein the variable modification comprises a torque correction propulsive torque added to a base propulsion torque determined by the propulsive torque determiner.

6. The vehicle control system of claim 3, wherein the variable modification comprises an overlay braking torque added to a base braking torque determined by the braking torque determiner, and an offsetting propulsive torque added to a base propulsion torque determined by the propulsive torque determiner.

7. The vehicle control system of claim 2, wherein the trigger event comprises vehicle stopping, and
    wherein the variable modification comprises an obstacle build term that includes a torque boost value that increases as time stopped increases.

8. The vehicle control system of claim 7, wherein the obstacle build term decreases responsive to vehicle motion above a threshold.

9. The vehicle control system of claim 1, further comprising a driveline state control module operably coupled to the torque control module to reduce the propulsive torque request and monitor a direction of vehicle speed responsive to a driveline state change request while in the one of the operator selectable modes of operation.

10. The vehicle control system of claim 9, wherein the driveline state control module is configured to enable the torque control module to apply braking torque to stop the vehicle responsive to a change of direction in vehicle speed until the state change is complete.

11. A vehicle control system comprising a driveline state control module and a torque control module, the driveline state control module comprising processing circuitry configured to:
    communicate a driveline state change request to the torque control module; and
    monitor a direction of vehicle speed responsive to the driveline state change request to enable the torque control module to apply braking torque to stop the vehicle responsive to a change of direction in vehicle speed until a driveline state change is complete;
    wherein, in a first selectable mode of operation, the torque control module is configured to generate both a first propulsive torque request and a first braking torque request based on a difference between a target speed set by an operator and a measured vehicle speed; and
    wherein, in the first selectable mode of operation, a low speed correction module that is operably coupled to the torque control module is activated over a selected range of vehicle speeds to automatically provide a variable modification to the propulsive torque request or the braking torque request in response to a trigger event.

12. The vehicle control system of claim 11, wherein the torque control module comprises:
    a propulsive torque determiner configured to determine a normal mode propulsive torque request based on accelerator pedal position in a normal mode of operation; and
    a braking torque determiner configured to determine a normal mode braking torque request based on a brake pedal position during the normal mode of operation.

13. The vehicle control system of claim 12, wherein the trigger event comprises vehicle stopping, and wherein the variable modification comprises an obstacle build term that includes a torque boost value that increases as time stopped increases.

14. The vehicle control system of claim 13, wherein the obstacle build term decreases responsive to vehicle motion at a speed above a threshold.

15. The vehicle control system of claim 11, wherein the trigger event comprises vehicle speed in the selected range from zero to a first threshold speed, and wherein the variable modification is a maximum value at zero and reduces to zero by the first threshold speed.

16. The vehicle control system of claim 15, wherein the variable modification reduces to zero by a second threshold speed that is less than the first threshold speed.

17. The vehicle control system of claim 16, wherein the first threshold speed is about three miles per hour and the second threshold speed is about one mile per hour, and
wherein the variable modification comprises a torque correction propulsive torque added to a base propulsion torque determined by the propulsive torque determiner.

18. The vehicle control system of claim 15, wherein the variable modification comprises an overlay braking torque added to a base braking torque determined by the brake torque determiner, and an offsetting propulsive torque added to a base propulsion torque determined by the propulsive torque determiner.

19. The vehicle control system of claim 11, wherein the driveline state control module is operably coupled to the torque control module to reduce the propulsive torque request and monitor a direction of vehicle speed responsive to the driveline state change request while in the first selectable mode of operation or a normal mode of operation.

20. A method of providing automated control of vehicle speed in a driver assist mode;
the method comprising:
receiving an operator selection of the driver assist mode and a target speed;
monitoring vehicle speed;
generating a propulsive torque request and a braking torque request based on a difference between the target speed and the vehicle speed; and
responsive to vehicle speed being in a selected range from zero to about three miles per hour, initiating a low speed correction to automatically provide a variable modification to the propulsive torque request or the braking torque request.

* * * * *